Patented Feb. 13, 1934

1,947,028

UNITED STATES PATENT OFFICE 1,947,028

AZO DYES AND METHODS FOR THEIR PREPARATION

Harold Edward Woodward, Penns Grove, N. J., assignor to E. I. du Pont de Nemours & Company, Wilmington, Del., a corporation of Delaware No Drawing. Application September 2, 1932
Serial No. 631,504

12 Claims. (Cl. 260—86)

This invention relates to insoluble azo dyes and more particularly refers to insoluble monoazo dyes having a color ranging from yellow to orange, and particularly valuable for use as pigments in printing inks and paints.

Yellow azo dyes have in the past been prepared by coupling diazotized derivatives of aniline wih aceto-acet-anilide, -toludide, and -anisidide. These dyes, however, were subject to the great disadvantage that they possessed undesirable greenish shades, and in many cases were not fast to light.

It is an object of the present invention to produce azo dyes having brilliant colors ranging from yellow to orange. It is a further object to produce azo dyes which do not possess the undesirable greenish tinge common in many of the compounds previously used as pigments in printing inks and paints. Additional objects will appear hereinafter.

These objects are attained by the herein described invention wherein in a diazotized nitro-aniline, having substituted thereon halogen, alkoxy, or benzyl-oxy groups, is coupled with a compound having the following general formula:

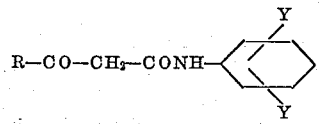

in which R represents an alkayl, phenyl or benzyl radical, and Y represents an alkoxy, benzyl-oxy, or benzyl radical.

The invention may be more fully understood by reference to the following illustrative examples.

Example 1

172.5 grams of 4-chlor-2-nitro-aniline was stirred in 1.2 liters water, cooled with ice to 5° C. and diazotized with 91 grams hydrochloric acid (100%) and 69 grams sodium nitrite. (The nitrite was added during one hour, and the solution was stirred one hour more at 5° C. with an excess of nitrite). It was then filtered into a suspension of aceto-acet-dimethoxy-anilide prepared as follows: 249 grams of aceto-acet-2-5-dimethoxy-anilide was dissolved in 3 liters water at 20-30° C. with 42 grams sodium hydroxide, and 110 grams sodium formate was added. About 38.5 grams hydrochloric acid (100%) was then added to precipitate the aceto-acet-dimethoxy-anilide and make the solution slightly acid to litmus. The diazo solution was added to this suspension during about one hour at 25° C. After the coupling was finished the insoluble orange pigment was filtered and washed with water. The dry weight was about 400 grams. The product was an orange colored powder, insoluble in water, and practically insoluble in alcohol and linseed oil. The melting point of the product recrystallized from toluene was 235.5-237.0° C. The full strength tones and reduced tints in lithographic varnish were a yellowish orange of very good fastness to light. The following formula represents its constitution:

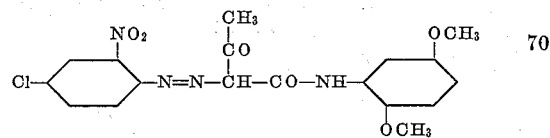

Example 2

When 168 grams of 3-nitro-4-amino-anisole was used in place of 172.5 grams of 4-chlor-2-nitro-aniline in Example 1 a color of similar properties was obtained, which gave reddish-orange printing inks. The constitution is represented by the following formula:

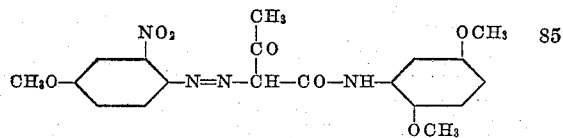

In place of the compounds used in the previous examples numerous other compounds may be substituted without detracting from the advantages of the products produced therein. For instance, in place of the halogen or alkoxy group substituted on the first component a benzyl-oxy group may be used. The halogen, alkoxy or benzyl-oxy group may occupy other positions than the one para to the amino group. Also, the nitro group may occupy the meta or para position, although somewhat better results are obtained if this group occupies the position ortho to the amino group. In addition to the nitro and alkoxy, halogen or benzyl-oxy groups, additional halogen and/or alkyl groups may be substituted on the first component.

For the methyl group at the beginning of the aceto-acetyl radical there may be substituted a phenyl or benzyl group. This phenyl or benzyl group may have substituted thereon nitro and/or halogen groups.

The anilide radicals in the examples have substituted thereon methoxy groups in the 2- and 5-position. In place thereof other alkoxy groups might be used as well as benzyl-oxy or benzyl groups. Although the 2—5 position is preferred for these groups they may also occupy any of the other positions, such as the 2—3, 2—4, or 3—5 positions. These groups may be the same or dissimilar. Besides the alkoxy and/or benzyl-oxy and/or benzyl groups substituted on this component alkyl and/or halogen groups may be substituted thereon.

Care should be taken that neither the nitro-aniline nor the anilide component contains carboxylic or sulfonic groups since the solubility of the resulting compound would be greatly increased.

The products produced according to the present invention have brilliant deep orange to yellow shades which are free from any undesirable greenish tinges. They are exceedingly fast to light, and for this reason are very desirable as pigments for printing inks and paints.

As many apparently widely different embodiments of this invention may be made without departing from the spirit and scope thereof, it is to be understood that I do not limit myself to the specific embodiments thereof except as defined in the appended claims.

I claim:

1. A process for producing insoluble azo dyes which comprises coupling diazotized nitro-aniline which has substituted thereon a member of the group consisting of halogen, alkoxy, and benzyl-oxy, with a compound having the following general formula:

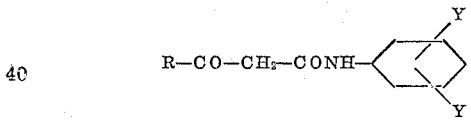

in which R represents an alkyl, phenyl, or benzyl radical, and Y represents an alkoxy, benzyl-oxy, or benzyl radical.

2. The process of claim 1 wherein the nitro group on the first component is ortho to the amino group.

3. The process of claim 1 wherein the nitro group on the first component is ortho to the amino group and the halogen, alkoxy, or benzyl-oxy group is para to the amino group.

4. A process for producing insoluble azo dyes which comprises coupling diazotized ortho-nitro-aniline which has substituted thereon in the para position a member of the group consisting of halogen and alkoxy, with an aceto-acet-2-5-dialkoxy anilide.

5. A process for producing azo dyes which comprises coupling diazotized 4-chlor-2-nitro-aniline with aceto-acet-2-5-dimethoxy-anilide.

6. A process for producing azo dyes which comprises coupling diazotized 3-nitro-4-amino-anisol with aceto-acet-2-5-dimethoxy-anilide.

7. Insoluble azo dye having the following probable formula:

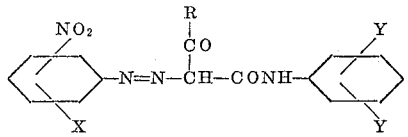

in which X represents halogen, alkoxy, or benzyl-oxy, R represents alkyl, phenyl, or benzyl, and Y represents alkoxy, benzyl-oxy, or benzyl.

8. Insoluble azo dye having the following probable formula:

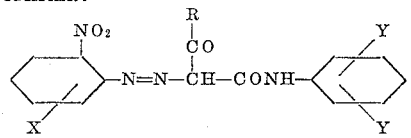

in which X represents halogen, alkoxy, or benzyl-oxy, R represents alkyl, phenyl, or benzyl, and Y represents alkoxy, benzyl-oxy, or benzyl.

9. Insoluble azo dye having the following probable formula:

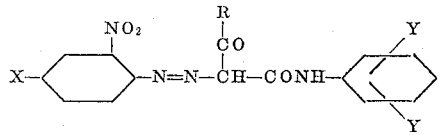

in which X represents halogen, alkoxy, or benzyl-oxy, R represents alkyl, phenyl, or benzyl, and Y represents alkoxy, benzyl-oxy, or benzyl.

10. Insoluble azo dye having the following probable formula:

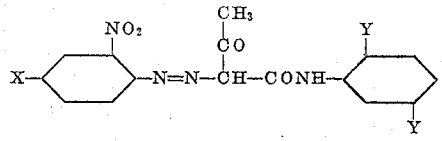

in which X represents halogen or alkoxy, and Y represents alkoxy.

11. An azo dye having the following probable formula:

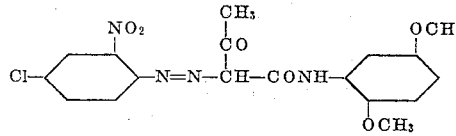

which is an orange colored powder, insoluble in water and practically insoluble in alcohol and linseed oil.

12. An azo dye having the following probable formula:

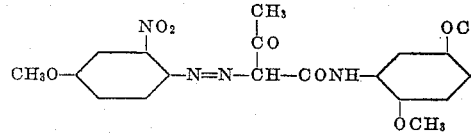

which is a reddish-orange colored powder, insoluble in water and practically insoluble in alcohol and linseed oil.

HAROLD E. WOODWARD.